US008921564B2

(12) United States Patent
Hasemann et al.

(10) Patent No.: US 8,921,564 B2
(45) Date of Patent: Dec. 30, 2014

(54) BASIC BISAZO COMPOUNDS

(75) Inventors: Ludwig Hasemann, Muellheim-Niederweiler (DE); Friedrich Lehr, Efringen-Kirchen (DE); Martin Oberholzer, Witterswil (CH); Heidrun Schene, Efringen-Kirchen (DE)

(73) Assignee: Clariant Finance (BVI) Ltd., Tortola (VG)

( * ) Notice: Subject to any disclaimer, the term of this patent is extended or adjusted under 35 U.S.C. 154(b) by 584 days.

(21) Appl. No.: 12/375,375

(22) PCT Filed: Jul. 25, 2007

(86) PCT No.: PCT/EP2007/057652
§ 371 (c)(1),
(2), (4) Date: Jan. 27, 2009

(87) PCT Pub. No.: WO2008/012322
PCT Pub. Date: Jan. 31, 2008

(65) Prior Publication Data
US 2010/0000033 A1      Jan. 7, 2010

(30) Foreign Application Priority Data

Jul. 28, 2006   (EP) .................................... 06118116

(51) Int. Cl.
| | | |
|---|---|---|
| *C09B 44/08* | (2006.01) | |
| *C09B 35/031* | (2006.01) | |
| *C07D 213/77* | (2006.01) | |
| *D21H 21/28* | (2006.01) | |
| *C09B 35/21* | (2006.01) | |
| *C09B 67/22* | (2006.01) | |
| *C09D 11/328* | (2014.01) | |

(52) U.S. Cl.
CPC .............. *D21H 21/28* (2013.01); *C09B 35/031* (2013.01); *C09B 35/21* (2013.01); *C09B 67/0055* (2013.01); *C09D 11/328* (2013.01); *Y10S 8/919* (2013.01)
USPC ............... 546/255; 8/115.51; 8/116.1; 8/129; 8/919; 162/162; 534/606; 534/607; 534/608; 534/609

(58) Field of Classification Search
USPC .................. 8/115.51–919; 162/162; 546/255; 534/606, 607, 608, 609
See application file for complete search history.

(56) References Cited

U.S. PATENT DOCUMENTS

| | | | |
|---|---|---|---|
| 4,023,924 A | | 5/1977 | Frei et al. |
| 4,068,085 A | * | 1/1978 | Ramanathan et al. ........ 534/604 |
| 4,149,851 A | | 4/1979 | Frei et al. |
| 4,739,042 A | * | 4/1988 | Lorenz et al. ................. 534/649 |
| 5,037,964 A | * | 8/1991 | Moser et al. .................. 534/608 |
| 5,352,334 A | * | 10/1994 | Moser et al. .................. 162/162 |
| 6,140,478 A | * | 10/2000 | Geiwiz et al. ................. 534/759 |
| 7,132,516 B2 | | 11/2006 | Pflieger |
| 7,183,409 B2 | | 2/2007 | Lehr et al. |

FOREIGN PATENT DOCUMENTS

| | | |
|---|---|---|
| DE | 399149 | 7/1924 |
| DE | 505475 | 8/1930 |
| DE | 1793020 | 2/1972 |
| DE | 3226889 | 1/1984 |
| DE | 3538517 | 5/1986 |
| DE | 3609590 | 10/1986 |
| DE | 4014847 | 11/1991 |
| DE | 19629238 | 1/1997 |
| FR | 1572030 | 6/1969 |
| GB | 1129306 | 10/1968 |
| GB | 1183544 | 3/1970 |
| GB | 1296857 | 11/1972 |
| GB | 2166752 | 5/1986 |
| GB | 2173210 | 10/1986 |
| JP | 2004-083903 A | 3/2004 |

OTHER PUBLICATIONS

PCT International Search Report for PCT/EP2007/057652, mailed Nov. 22, 2007.
PCT Written Opinion of the International Searching Authority for PCT/EP2007/057652.
English Abstract for DE 505475, Aug. 18, 1930.
English Abstract for EP 0099516 corresponding to DE 3226889, Jan. 19, 1984.
English Abstract for DE 4014847, Nov. 14, 1991.

* cited by examiner

*Primary Examiner* — Tri V Nguyen
(74) *Attorney, Agent, or Firm* — Miles & Stockbridge P.C.

(57) ABSTRACT

The invention relates to basic bisazo compounds according to formula (I)

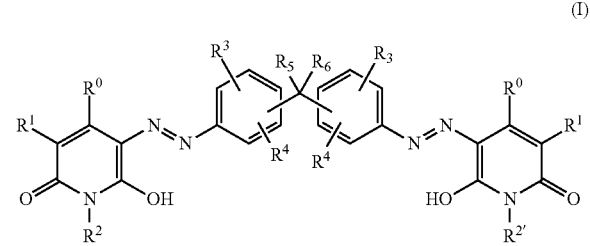

(I)

wherein all substituents are defined as in Claim 1, their production, their use as dyestuffs as well as material dyed with these dyestuffs.

14 Claims, No Drawings

BASIC BISAZO COMPOUNDS

The invention relates to basic bisazo compounds, salts thereof and mixtures of these compounds, which may be in internal or external, salt form. They are suitable for use as dyestuffs.

GB 1296857 or GB2173210 disclose basic metal-free or metallised disazo pyridone dyes free from sulphonic acid groups, are useful for dyeing paper, textiles and leather.

However there is still a need to produce dyes having improved properties. Surprisingly, it was found that dyes according to formula (I) as shown below of the present application have those desired properties.

According to the invention there are provided compounds of formula (I)

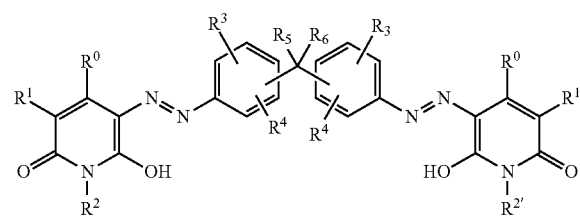

(I)

$R^0$ signifies a substituted $C_1$ to $C_4$ alkyl group or an unsubstituted $C_1$ to $C_4$ alkyl group, $R^1$ signifies H, N($R^{7'}R^{7''}$), a substituted $C_1$ to $C_4$ alkyl group or an unsubstituted $C_1$ to $C_4$ alkyl group or CN, $R^2$ or $R^{2'}$ signify H, a substituted $C_1$ to $C_4$ alkyl group or an unsubstituted $C_1$ to $C_4$ alkyl group, or a group with the formula

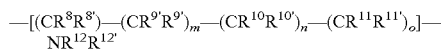

where m, n and o have the meaning of 1 or 0, and $R^8$, $R^{8'}$, $R^9$, $R^{9'}$, $R^{10}$, $R^{10'}$, $R^{11}$ or $R^{11'}$ signify independently H, a substituted $C_1$ to $C_4$ alkyl group or an unsubstituted $C_1$ to $C_4$ alkyl group; and $R^{12}$ or $R^{12'}$ signify independently H, a substituted $C_1$ to $C_4$ alkyl group or an unsubstituted $C_1$ to $C_4$ alkyl group.

$R^3$ signify H, a substituted $C_1$ to $C_4$ alkyl group or an unsubstituted $C_1$ to $C_4$ alkyl group, a substituted $C_1$ to $C_4$ alkoxy group or an unsubstituted $C_1$ to $C_4$ alkoxy group, $R^4$ signifies H, a substituted $C_1$ to $C_4$ alkyl group or an unsubstituted $C_1$ to $C_4$ alkyl group, a substituted $C_1$ to $C_4$ alkoxy group or an unsubstituted $C_1$ to $C_4$ alkoxy group, $R^5$ signifies substituted H, $C_1$ to $C_9$ alkyl group or an unsubstituted $C_1$ to $C_9$ alkyl group, $R^6$ signifies a substituted $C_1$ to $C_9$ alkyl group or an unsubstituted $C_1$ to $C_9$ alkyl group, an unsubstituted aryl group or a substituted aryl group, $R^{7'}$ or $R^{7''}$ signify independently a substituted $C_1$ to $C_4$ alkyl group or an unsubstituted $C_1$ to $C_4$ alkyl group, or $R^{7'}$ and $R^{7''}$ form together with the nitrogen atom a five or six membered aromatic or a five or six membered cyclo alipahatic, wherein the five or six membered rings are substituted by a $C_1$ to $C_4$ alkyl group or the five or six membered rings are not further substituted, By preference, the sum of carbon atoms of $R^5$ and $R^6$ together is at least 4 carbon atoms, more preferred $R^5$ and $R^6$ have together at least 5 carbon atoms. Even more preferred, the sum of carbon atoms of $R^5$ and $R^6$ together is 5 or 6 or 7 or 8 or 9 carbon atoms. When the substituent $R^6$ signifies H the substituent $R^6$ signifies by preference H.

In preferred compounds of formula (I)

$R^0$ signifies a substituted $C_1$ to $C_4$ alkyl group or an unsubstituted $C_1$ to $C_4$ alkyl group, $R^1$ signifies N($R^{7'}R^{7''}$), a substituted $C_1$ to $C_4$ alkyl group or an unsubstituted $C_1$ to $C_4$ alkyl group, $R^2$ or $R^{2'}$ a group with the formula

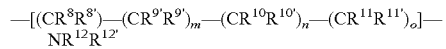

where m, n and o have the meaning of 1 or 0, and $R^8$, $R^{8'}$, $R^9$, $R^{9'}$, $R^{10}$, $R^{10'}$, $R^{11}$ or $R^{11'}$ signify independently H, a substituted $C_1$ to $C_4$ alkyl group or an unsubstituted $C_1$ to $C_4$ alkyl group; and $R^{12}$ or $R^{12'}$ signify independently H, a substituted $C_1$ to $C_4$ alkyl group or an unsubstituted $C_1$ to $C_4$ alkyl group, $R^3$ signifies H, a substituted $C_1$ to $C_4$ alkyl group or an unsubstituted $C_1$ to $C_4$ alkyl group, a substituted $C_1$ to $C_4$ alkoxy group or an unsubstituted $C_1$ to $C_4$ alkoxy group, $R^4$ signifies H, $C_1$ to $C_4$ alkyl group, $C_1$ to $C_4$ alkoxy group $R^5$ signifies substituted H, $C_1$ to $C_9$ alkyl group or an unsubstituted $C_1$ to $C_9$ alkyl group, $R^6$ signifies a substituted $C_1$ to $C_9$ alkyl group or an unsubstituted $C_1$ to $C_9$ alkyl group, an unsubstituted aryl group or a substituted aryl group, $R^{7'}$ and $R^{7''}$ form together with the nitrogen atom a five or six membered aromatic, wherein the five or six membered rings is substituted by a $C_1$ to $C_4$ alkyl group or the five or six membered ring is not further substituted, By preference $R^1$ signifies

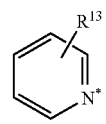

wherein the * shows the point of attachment to the rest of the molecule and wherein $R^{13}$ signifies H, a substituted $C_1$ to $C_4$ alkyl group or an unsubstituted $C_1$ to $C_4$ alkyl group, a substituted $C_1$ to $C_4$ alkoxy group or an unsubstituted $C_1$ to $C_4$ alkoxy group. The preferred group $R^{13}$ signifies H or Methyl. The preferred group $R^{13}$ is attached in the para-position to the nitrogen. Preferably the substituent is attached in para position to the nitrogen atom.

By preference $R^2$ or $R^{2'}$ signify a group with the formula

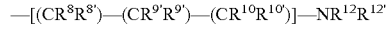

where $R^8$, $R^{8'}$, $R^9$, $R^{9'}$, $R^{10}$ or $R^{10'}$ signify independently H, a substituted $C_1$ to $C_4$ alkyl group or an unsubstituted $C_1$ to $C_4$ alkyl group; and $R^{12}$ or $R^{12'}$ signifies independently H, a substituted $C_1$ to $C_4$ alkyl group or an unsubstituted $C_1$ to $C_4$ alkyl group and, even more preferred $R^8$, $R^{8'}$, $R^9$, $R^{9'}$, $R^{10}$ or $R^{10'}$ signify independently H and $R^{12}$ or $R^{12'}$ signify independently from each other H, methyl or ethyl, more preferred methyl. In very preferred compounds $R^2$ and $R^{2'}$ have the same meaning.

Aryl means phenyl or naphtyl, by preference phenyl, Substituted aryl means aryl groups substituted by —COOH, —OH, $C_{1-4}$alkyl groups or $C_{1-4}$alkoxy groups.

Generally, alkyl or alkoxy groups are by preference $C_{1-4}$alkyl groups or $C_{1-4}$alkoxy groups; $C_{1-4}$alkyl groups or $C_{1-4}$alkoxy which may be further substituted by $C_{1-4}$alkyl, —COOH, —OH. Preferred alkyl groups are methyl or ethyl. Preferred substituents of the alky groups or alkoxy groups is OH. When $R^{8'}$, $R^{8''}$ $R^{9'}$; $R^{9''}$ are substituted alkyl groups, the preferred substituent is —OH. Preferred alkoxy groups are methoxy or ethoxy. The alkyl groups and the alkoxy groups are branched or linear.

However, the more preferred alkyl or alkoxy groups for $R^5$ and $R^6$ signify a substituted $C_1$ to $C_9$ alkyl group or an unsubstituted $C_1$ to $C_9$ alkyl group and are branched or linear and the substituents may be selected from the group of —COOH, —OH. The most preferred alkyl groups are methyl, ethyl, propyl, iso-propyl, butyl, iso-butyl, pentyl, hexyl, heptyl, octyl, or nonyl.

The present invention further provides a process for the preparation of compounds of formula (I) comprising reacting the bis-diazonium salt of a di-amine of formula (II),

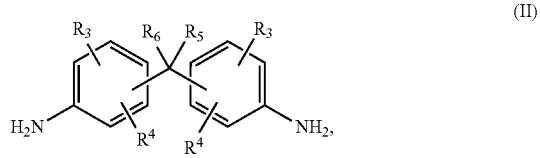

with one equivalent compound of formula (III) and one equivalent compound of formula (III')

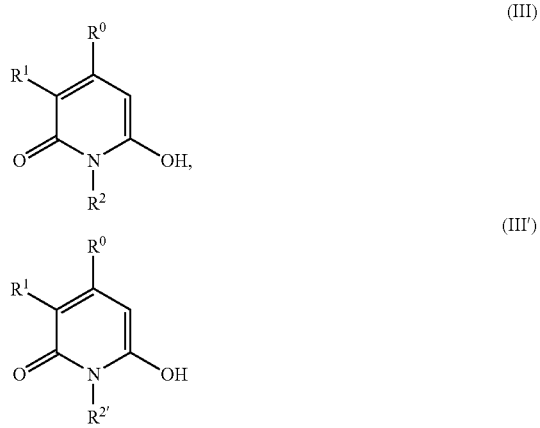

in which $R^0$, $R^1$, $R^2$, $R^{2'}$, $R^3$, $R^4$, $R^5$ and $R^6$ are defined as above defined.

Diazotisation and coupling may be effected in accordance with conventional methods. The coupling reaction advantageously is carried out in an aqueous reaction medium in a temperature range of from 0-60° C., preferably at 0-40° C., more preferred at 0-10° C., even more preferred at 0-5° C. and in a pH range of from 2 to 9, preferably at pH 3 to 6. All temperatures are given in degrees Celsius.

The reaction mixtures comprising compounds of formula (I) thus obtained may be converted into stable liquid formulations with improved long term stability by desalting by ultra filtration.

The compounds of formula (I) thus obtained may be isolated in accordance with known methods.

The compounds of formula (I) containing free basic groups may be converted wholly or in part into water-soluble salts by reacting with any inorganic or organic acids for example with lactic acid, or acetic acid, or formic acid, or with hydrochloric acid, or with sulfuric acid.

Furthermore it is also possible to convert the compounds of formula (I) containing free basic groups of different salts by applying a mixture of inorganic or organic acids, for examples mixtures of the two or more acids selected from lactic acid, acetic acid, formic acid, hydrochloric acid, and sulfuric acid. Thus the compounds of formula (I) containing free basic groups may after the treatment with lactic acid and hydrochloric acids consist of a mixed salt with chloride and lactate anions or the compounds of formula (I) containing free basic groups may after the treatment with acetic acid and hydrochloric acids consist of a mixed salt with chloride and acetate anions.

The starting compounds, the amines of formula (II) and of compounds of formula (III), are either known or may be prepared in accordance with known methods from available starting materials. Suitable methods are described e.g. in DE399149; DE505475; DE1220863; DE1793020 (GB1129306), DE3226889, DE4014847.

However, novel amines according to the formula (II) may be prepared according the methods disclosed in DE399149; DE505475; DE1220863; DE1793020 (GB 1129306), DE3226889, DE4014847, thus more precisely either starting form aldehydes (when $R^5$ is H and $R^6$ is different from H) or from ketones (when both $R^5$ and $R^6$ are different from H) of the formula

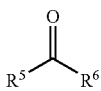

by reacting at elevated temperature and elevated pressure under acidic condition with two equivalents of an aromatic amine of the formula

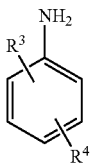

forming the diamine of the formula (III)

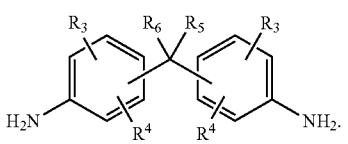

The reaction mixture is heated in a closed autoclave at 120° C.-250° C., preferably 140° C.-200° C., more preferably 140° C. to 150° C. the reaction mixture is kept at this temperature for 3-8 hours, preferably for 4-5 hours. The elevated temperature leads in this closed autoclave to the elevated pressure. Alternatively the synthesis may be performed in the melt of the aminocompound-hydrochloride adding the ketocompound at elevated temperature 200 to 250° C. and the pressure is atmospheric pressure.

The compounds according to the invention, in acid addition salt form or quaternary ammonium salt form, may be used for dyeing cationic dyeable materials such as: homo- or mixed-polymers of acrylonitrile, acid modified polyester or polyamide; wool; leather including low affinity vegetable-tanned leather; cotton; bast fibers such as hemp, flax, sisal, jute, coir and straw; regenerated cellulose fibers, glass or glass products comprising glass fibers; and substrates comprising cellulose for example paper and cotton. They may also be used for printing fibers, filaments and textiles comprising any of the above mentioned materials in accordance with known methods. Printing may be effected by impregnation of the material to be printed with a suitable printing paste comprising one or more compounds of the present invention. The type of printing paste employed, may vary depending on the material to be printed. Choice of a suitable commercially available printing paste or production of a suitable paste, is routine for one skilled in the art. Alternatively the compounds of the present invention may be used in the preparation of inks suitable for example for jet printing, in accordance with conventional methods.

Most preferably, the dyestuffs are used for dyeing or printing of paper e.g., sized or unsized, wood-free or wood-containing paper or paper-based products such as cardboard. They may be used in continuous dyeing in the stock, dyeing in the size press, in a conventional dipping or surface coloring process. The dyeing and printing of paper is effected by known methods.

The dyeings and prints and particularly those obtained on paper, show good fastness properties.

Especially the waste water values are very good when dyed or printed paper or paper-based products are produced in medium or deep shades.

The compounds of formula (I) may be converted into dyeing preparations. Processing into stable liquid, preferably aqueous, or solid (granulated or powder form) dyeing preparations may take place in a generally known manner. Advantageously suitable liquid dyeing preparations may be made by dissolving the dyestuff in suitable solvents or in a mixture of suitable solvents such as mineral acids or organic acids, e.g., hydrochloric acid, sulphuric acid, phosphoric acid, formic acid, acetic acid, lactic acid, glycolic acid, citric acid and methanesulphonic acid. Furthermore formamide, dimethylformamide, urea, glycols and ethers thereof, dextrin or addition products of boric acid with sorbit may be used together with water, optionally adding an assistant, e.g. a stabilizer. Such preparations may be obtained, for example, as described in FR1572030 (U.S. Pat. No. 4,023,924).

The compounds of formula (I) (in the corresponding salt form) have good solubility especially in cold water. Owing to their high substantivity the compounds of the present invention exhaust practically quantitatively and show a good build-up power. They can be added to the stock directly, i.e. without previously dissolving, as either a dry powder or granulate, without reducing the brilliance or the yield of color. They can also be used in soft water without loss of yield. They do not mottle when applied on paper, are not inclined to give two-sided dyeing on paper and are practically insensitive to filler or pH variations. They operate over a broad pH range, in the range of from pH 3 to 10. When producing sized or unsized paper, the wastewater is essentially colorless. This feature, which is extremely important from an environmental viewpoint, when compared with similar known dyes, shows a marked improvement. A sized paper dyeing when compared with the corresponding unsized paper dyeing does not show any decrease in strength.

The paper dyeings or printings made with the compounds according to the invention are clear and brilliant and have good light fastness. On exposure to light for a long time, the shade of the dyeing fades tone in tone. They show very good wet fastness properties; being fast to water, milk, fruit juice, sweetened mineral water, tonic water, soap and sodium chloride solution, urine etc. Furthermore, they have good alcohol fastness properties. The wet fastness properties are improved compared to known dyes showing otherwise similar properties. They do not exhibit a tendency towards two-sidedness.

Paper dyed or printed with the compounds of the present invention can be bleached either oxidatively or reductively, a feature, which is important for the recycling of waste paper and old paper products.

The compounds of the present invention may also be used to dye paper containing wood-pulp where even dyeings, having good fastness properties are obtained. Furthermore, they may be used for the production of coated paper in accordance with known methods. Preferably when coating, a suitable filler, for example kaolin, is employed in order to give a one-side coated paper.

The compounds of the present invention are also suitable for dyeing in combination with other dyes for example other cationic or anionic dyes. The compatibility of the compounds of the present invention when used as a dye in mixtures with other commercially available dyes, may be determined according to conventional methods. The thus obtained dyeings have good fastness properties.

The invention yet further provides use of a compound of the present invention for dyeing or printing any of the above-mentioned substrates.

The invention further provides a substrate, which has been dyed or printed with a compound of the present invention. The substrate may be selected from any of the above mentioned substrates. A preferred substrate is a substrate comprising cellulose such as cotton or paper or paper based product.

The dye preparations of the present invention can also be used for dyeing and tinting wood. The wood can be in the form of articles, such as bowls, dishes, toys, but also solid slats and beams, and also in the form of shavings, chips or chipboard. Parts of buildings can similarly be treated with the dye preparations of the present invention, as can furniture. The application of the liquid dye preparations of the present invention can be utilized for equalizing colour differences in the wood or in a veneer, but also for completely changing the colour of the wood or of a veneer. The liquid dye preparations of the present invention can be utilized as an aqueous stain (in which case water is the main solvent), as an alcoholic-aqueous stain (i.e. the solvent is an alcohol-water mixture) or as stains involving organic solvents (about 30-95% of organic solvents; such stains may also possibly be water thinnable).

The following examples further serve to illustrate the invention. In the Examples all parts and all percentages are by weight or volume, and the temperatures given are in degrees Celsius, unless indicated to the contrary.

The invention will now be illustrated by the following Examples in which all parts are by weight and all temperatures are in degrees Celsius.

EXAMPLE 1

Method A 106 g benzaldehyde, 400 g o-anisidine, 450 g hydrochloric acid (ca. 30%) and 800 ml water were heated in an autoclave at 140° C. for 6 hours.

The reaction mixture was poured on 1 kg ice and 500 g sodium hydroxide solution (30%). The organic layer was separated and the excess of o-anisidine separated with toluene. The residue was re-crystallized from toluene and the press cake washed with cold alcohol. A compound of the formula (I) was obtained); Yield: 41%

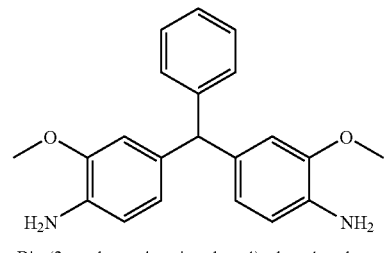

Bis-(3-methoxy-4-aminophenyl)-phenylmethane (1)

EXAMPLE 2

Method B 780 g (6 mol) of aniline hydrochloride are melted in a 1.5-1 reaction vessel under nitrogen at 220° C. and 100 g (1 mol) of 2-Ethylbutyraldehyde is slowly added thereto while stirring over a period of 4 hour.

The temperature of the melt falls from initially ca. 200° C. to 185° C. because of the reflux. The temperature is kept for one hour at 185° C. and the hot melt is poured on a mixture of 1.6 kg ice and 1.05 kg of sodium hydroxide solution (30%).

The organic layer is separated and washed free from salt with demineralised water. The excess of aniline is extracted by water steam distillation.

The residue, ca. 180 g was re-crystallized from toluene and the press cake is washed with cold ethanol. A compound of the formula (2) was obtained); Yield: 48%

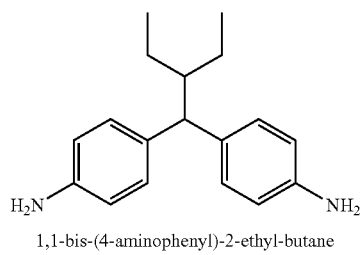

(2)

1,1-bis-(4-aminophenyl)-2-ethyl-butane

TABLE 1

Synthesis of the di amines starting with aldehydes

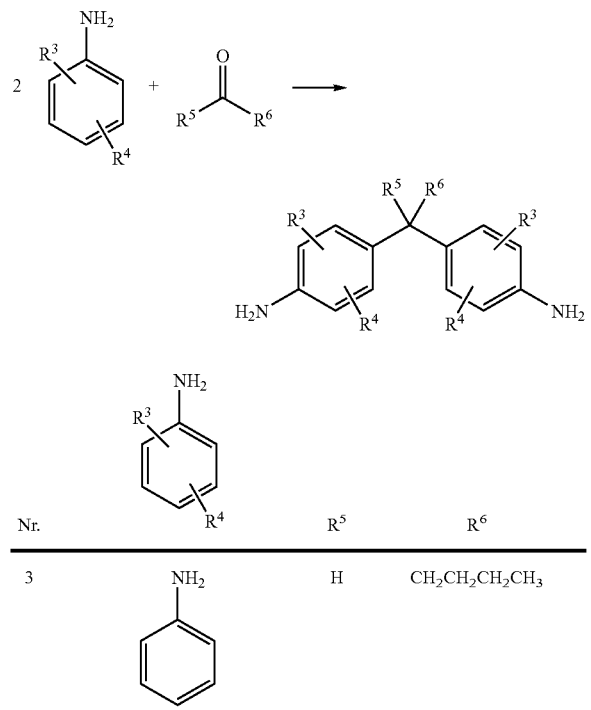

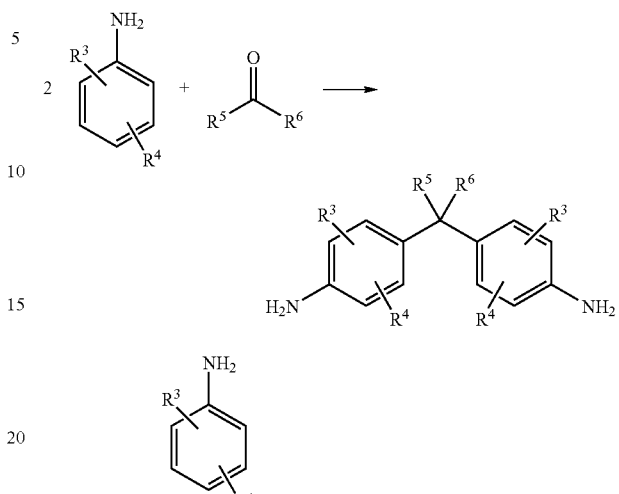

| Nr. | $R^4$ | $R^5$ | $R^6$ |
|---|---|---|---|
| 3 | NH$_2$ (phenyl) | H | CH$_2$CH$_2$CH$_2$CH$_3$ |
| 4 | NH$_2$ (phenyl) | H | CH$_2$CH(CH$_3$)$_2$ |
| 5 | NH$_2$ (phenyl) | H | CH(CH$_3$)CH$_2$CH$_3$ |
| 6 | NH$_2$ (phenyl) | H | CH(CH$_3$)CH$_2$CH$_2$CH$_3$ |
| 7 | NH$_2$ (phenyl) | H | (CH$_2$)$_5$CH$_3$ |
| 8 | NH$_2$ (phenyl) | H | (CH$_2$)$_4$CH$_3$ |
| 9 | NH$_2$ (phenyl) | H | CH(CH$_2$CH$_3$)(CH$_2$)$_3$CH$_3$ |
| 10 | NH$_2$ (phenyl) | H | (CH$_2$)$_6$CH$_3$ |

TABLE 1-continued

Synthesis of the di amines starting with aldehydes

Reaction scheme: aniline (with R³, R⁴ substituents) + R⁵-C(=O)-R⁶ → diamine product with two aniline rings linked by C(R⁵)(R⁶).

| Nr. | Aniline (R³/R⁴) | R⁵ | R⁶ |
|---|---|---|---|
| 11 | aniline (NH₂) | H | (CH₂)₇CH₃ |
| 12 | aniline (NH₂) | H | (CH₂)₈CH₃ |
| 13 | aniline (NH₂) | H | CH₂-Ph |
| 14 | aniline (NH₂) | H | Ph |
| 15 | aniline (NH₂) | H | 4-Ph-CH₃ |
| 16 | aniline (NH₂) | H | 4-Ph-CH(CH₃)₂ |
| 17 | aniline (NH₂) | H | 4-Ph-t-Bu |
| 18 | aniline (NH₂) | H | 4-Ph-OCH₃ |
| 19 | aniline (NH₂) | H | 4-Ph-OCH₂CH₃ |
| 20 | 2-methylaniline | H | CH₂CH(CH₃)₂ |
| 21 | 2-methylaniline | H | CH(CH₂CH₃)₂ |
| 22 | 2-methylaniline | H | Phenyl |
| 23 | 2-methylaniline | H | 4-Ph-CH₃ |
| 24 | 2-methylaniline | H | 4-Ph-OCH₃ |

TABLE 1-continued

Synthesis of the di amines starting with aldehydes

R³-substituted aniline (with R⁴) + R⁵C(=O)R⁶ → bis(aminoaryl)methane derivative with R³, R⁴, R⁵, R⁶ substituents

| Nr. | Aniline (R³/R⁴) | R⁵ | R⁶ |
|---|---|---|---|
| 25 | 2,6-dimethylaniline | H | CH(CH₂CH₃)₂ |
| 26 | 2,6-dimethylaniline | H | Phenyl |
| 27 | 2,6-dimethylaniline | H | 4-Ph-CH₃ |
| 28 | 2,6-dimethylaniline | H | 4-Ph-OCH₃ |
| 29 | 2-methoxyaniline | H | CH(CH₂CH₃)₂ |
| 30 | 2-methoxyaniline | H | CH(CH₂CH₃)(CH₂)₃CH₃ |
| 31 | 2-methoxyaniline | H | 4-Ph-CH₃ |
| 32 | 2-methoxyaniline | H | 4-Ph-OCH₃ |
| 33 | 2-ethoxyaniline | H | CH(CH₂CH₃)₂ |
| 34 | 2-ethoxyaniline | H | CH(CH₂CH₃)(CH₂)₃CH₃ |
| 35 | 2-ethoxyaniline | H | Phenyl |
| 36 | 2,5-dimethoxyaniline | H | CH(CH₂CH₃)₂ |
| 37 | 2,5-dimethoxyaniline | H | CH(CH₂CH₃)(CH₂)₃CH₃ |

TABLE 1-continued

Synthesis of the di amines starting with aldehydes

| Nr. | R⁴ | R⁵ | R⁶ |
|-----|----|----|----|
| 38 | NH₂, 2-OCH₃, 5-OCH₃ | H | Phenyl |
| 39 | NH₂, 2-OCH₃, 5-OCH₃ | H | 4-Ph-OCH₃ |

EXAMPLE 40

Method A 101 g Ethyl-propylketone, 500 g o-anisidine, 500 g hydrochloric acid (a. 30%) and 1000 ml water were heated in an autoclave at 140° C. for 6 hours.

The reaction mixture was poured on 1 kg ice and 600 g sodium hydroxide solution (30%). The organic layer was separated and the excess of o-anisidine extracted with toluene. The residue was re-crystallized from toluene and the press cake washed with cold alcohol. A compound of the formula (3) was obtained; Yield: 33%

(3)

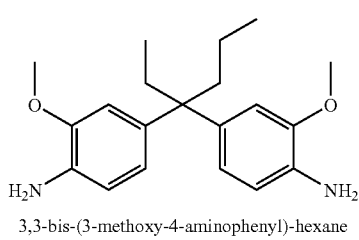

3,3-bis-(3-methoxy-4-aminophenyl)-hexane

EXAMPLE 41

Method B 780 g (6 mol) of aniline hydrochloride are melted in a 1-l reaction vessel under nitrogen at 220° C. and 86 g (1 mol) of 3-Pentanone is slowly added thereto while stirring over a period of 3-4 hour.

The temperature of the melt falls from initially ca. 200° C. to 185° C. because of the reflux. The temperature is kept for one hour at 185° C. and the hot melt is poured on a mixture of 1.6 kg ice and 1.05 kg of sodium hydroxide solution (30%).

The organic layer is separated and washed free from salt with demineralised water. The aniline excess is extracted by water steam distillation.

The residue, ca. 160 g was re-crystallized from toluene and the press cake is washed with cold ethanol. A compound of the formula (4) was obtained; Yield: 52%

(4)

3,3-bis-(4-aminophenyl)-pentane

TABLE 2

Synthesis of the di-amines starting with ketones

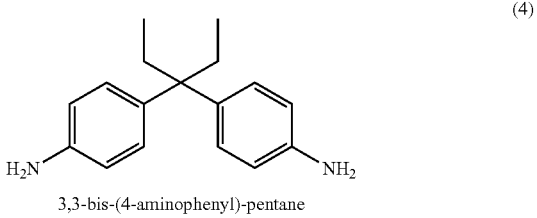 [SMILES: CCC(CC)(c1ccc(N)cc1)c1ccc(N)cc1]

| Nr. | R⁴ | R⁵ | R⁶ |
|-----|----|----|----|
| 42 | NH₂ | CH₃ | CH₂CH₂CH₃ |
| 43 | NH₂ | CH₃ | CH(CH₃)₂ |

TABLE 2-continued

Synthesis of the di-amines starting with ketones

| Nr. | R³/R⁴ (aniline) | R⁵ | R⁶ |
|---|---|---|---|
| 44 | NH₂-phenyl | $CH_3$ | $CH_2CH_2CH_2CH_3$ |
| 45 | NH₂-phenyl | $CH_3$ | $CH_2CH(CH_3)_2$ |
| 46 | NH₂-phenyl | $CH_3$ | $CH_2CH_2CH_2CH_3$ |
| 47 | NH₂-phenyl | $CH_3$ | $CH_2CH_2CH(CH_3)_2$ |
| 48 | NH₂-phenyl | $CH_3$ | $CH_2CH_2CH_2CH_2CH_2CH_3$ |
| 49 | NH₂-phenyl | $CH_3$ | $CH_2Ph$ |
| 50 | NH₂-phenyl | $CH_3$ | $CH_2CH_2Ph$ |
| 51 | NH₂-phenyl | $CH_2CH_3$ | $CH_2CH_2CH_3$ |
| 52 | NH₂-phenyl | $CH_2CH_3$ | $CH_2CH_2CH_2CH_3$ |
| 53 | NH₂-phenyl | $CH_2CH_3$ | $CH_2CH_2CH_2CH_3$ |
| 54 | NH₂-phenyl | $CH_2CH_3$ | $CH_2CH_2CH_2CH_2CH_2CH_3$ |
| 55 | NH₂-phenyl | $CH_2CH_3$ | $CH_2CH_2CH(CH_3)_2$ |
| 56 | NH₂-phenyl | $CH_2CH_3$ | $CH_2CH(CH_3)CH_2CH_3$ |
| 57 | NH₂-phenyl | $CH_2CH_2CH_3$ | $CH_2CH_2CH_3$ |

TABLE 2-continued

Synthesis of the di-amines starting with ketones

[Reaction scheme: aniline derivative (with $R^3$, $R^4$) + ketone $R^5COR^6$ → bis(aminophenyl) compound]

| Nr. | (aniline with $R^3$, $R^4$) | $R^5$ | $R^6$ |
|---|---|---|---|
| 58 | aniline | $CH(CH_3)_2$ | $CH(CH_3)_2$ |
| 59 | aniline | $CH_2CH_2CH_2CH_3$ | $CH_2CH_2CH_2CH_3$ |
| 60 | aniline | $CHCH_2(CH_3)_2$ | $CHCH_2(CH_3)_2$ |
| 61 | 2-methylaniline | $CH_2CH_3$ | $CH_2CH_3$ |
| 62 | 2-methylaniline | $CH_2CH_3$ | $CH_2CH_2CH_2CH_3$ |
| 63 | 2,6-dimethylaniline | $CH_2CH_3$ | $CH_2CH_3$ |
| 64 | 2,6-dimethylaniline | $CH_2CH_3$ | $CH_2CH_2CH_2CH_3$ |
| 65 | 2-methoxyaniline | $CH_3$ | $CH_2CH(CH_3)_2$ |
| 66 | 2-methoxyaniline | $CH_2CH_3$ | $CH_2CH_3$ |
| 67 | 2-methoxyaniline | $CH_2CH_3$ | $CH_2CH_2CH_2CH_3$ |

EXAMPLE 68

26.8 Parts (0.1 mol) of 1,1-bis-(4-aminophenyl)-2-ethyl-butane (bridge-example 2) are tetrazotised according to known methods with 13.8 parts (0.2 mol) of sodium nitrite at 0-5° C. in 200 parts of water and 60 parts of hydrochloric acid (ca. 30%).

64.4 parts (0.2 mol) of a compound of the formula

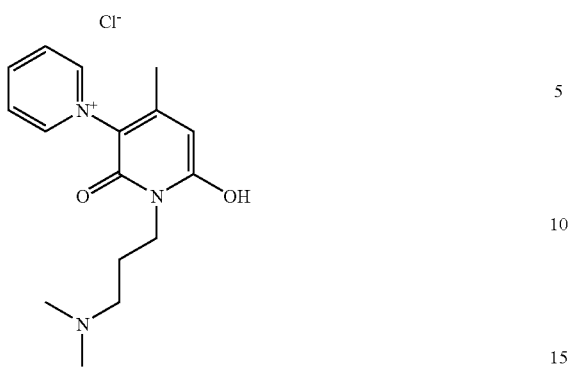

dissolved in 250 parts of water are added over 30 minutes to the ice cold tetrazotised solution. By the addition of 30% NaOH solution the pH is brought to 3-4.5 yielding a dyestuff of formula (5) and the dyestuff is in solution. λmax=459 nm.

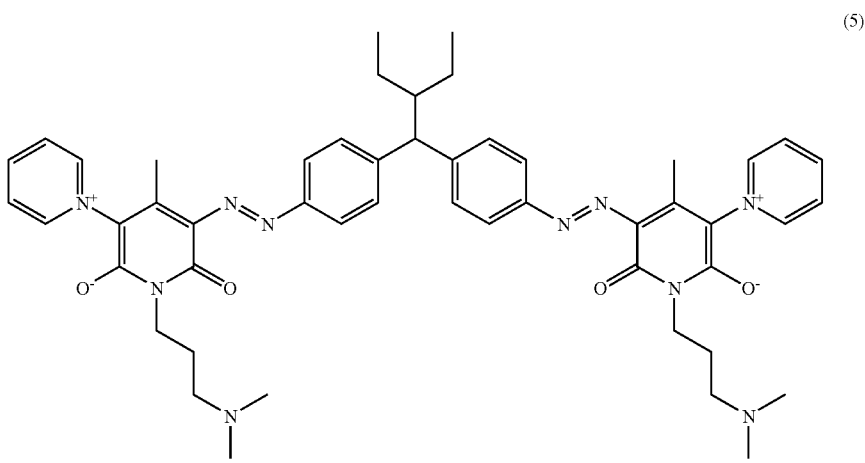 [SMILES: CCC(CC)C(c1ccc(/N=N/c2c(C)c(-[n+]3ccccc3)c([O-])n(CCCN(C)C)c2=O)cc1)c1ccc(/N=N/c2c(C)c(-[n+]3ccccc3)c([O-])n(CCCN(C)C)c2=O)cc1]

(5)

The dyestuff can be isolated by concentration under vacuum or by precipitation in aceton/alcohol.

The reaction mixture however can be used directly for dyeing without isolation the product. The dyestuff of formula (5) has surprisingly very high solubility in water and gives yellow dyeings with very good fastness properties.

EXAMPLE 69

33.4 Parts (0.1 mol) of Bis-(3-methoxy-4-aminophenyl)-phenylmethane (bridge-example 1) are tetrazotised according to known methods with 13.8 parts (0.2 mol) of sodium nitrite at 0-5° C. in 200 parts of water and 60 parts of hydrochloric acid (ca. 30%).

64.4 parts (0.2 mol) of a compound of the formula

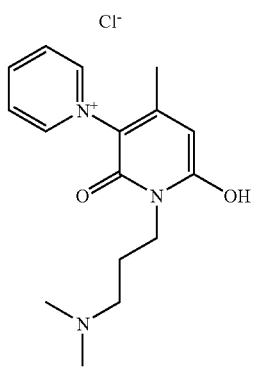 [SMILES: [Cl-] ; Cc1cc(O)n(CCCN(C)C)c(=O)c1-[n+]1ccccc1]

dissolved in 250 parts of water are added over 30 minutes to the ice cold tetrazotised solution. By the addition of 30% NaOH solution the pH is brought to 3-4.5 yielding a dyestuff of formula (6) and the dyestuff is in solution. λmax 475 nm.

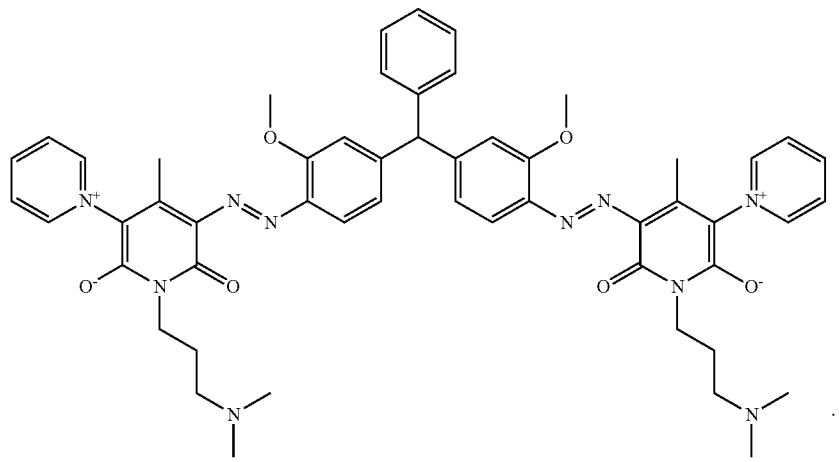

(6)

The dyestuff can be isolated by concentration under vacuum or by precipitation in aceton/alcohol.

The reaction mixture however can be used directly for dyeing without isolation the product. The dyestuff of formula (6) has very high solubility in water and gives yellow dyeings with surprisingly very good fastness properties.

TABLE 3 synthesis of the dyesstuff with the diamines from Table 1

The following compounds shown in the table 3a were synthesized according to the example 68 or 69 using the diamine

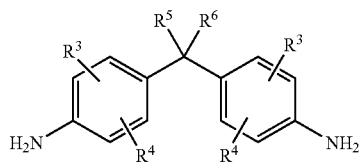

diazo component and reacted with coupling component

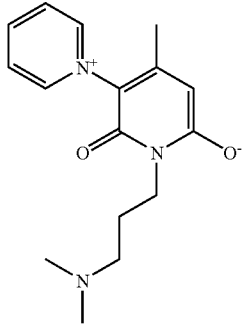

λ max (lambda max) is indicated in nm (nano meters; measured in 1% acetic acid solution).

| Dye-stuff-nr. | Diamine | Bridge-nr. | λ max |
|---|---|---|---|
| 70 | ![diamine structure] | 3 | 445 |

TABLE 3-continued
synthesis of the dyesstuff with the diamines from Table 1
The following compounds shown in the table 3a were synthesized according to the example 68 or 69 using the diamine
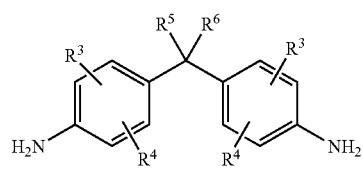
diazo component and reacted with coupling component
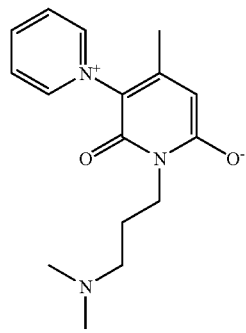
λ max (lambda max) is indicated in nm (nano meters; measured in 1% acetic acid solution).
| Dye-stuff-nr. | Diamine | Bridge-nr. | λ max |
|---|---|---|---|
| 71 | | 4 | 447 |
| 72 | | 5 | 450 |
| 73 | | 6 | 448 |
| 74 | | 7 | 449 |

TABLE 3-continued synthesis of the dyesstuff with the diamines from Table 1

The following compounds shown in the table 3a were synthesized according to the example 68 or 69 using the diamine

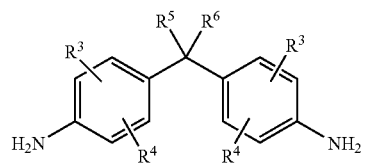

diazo component and reacted with coupling component

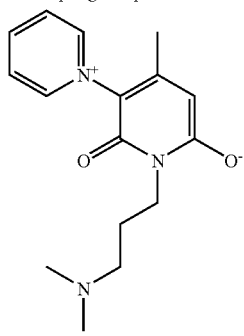

λ max (lambda max) is indicated in nm (nano meters; measured in 1% acetic acid solution).

| Dye-stuff-nr. | Diamine | Bridge-nr. | λ max |
|---|---|---|---|
| 75 | ![diamine] | 8 | 446 |
| 76 | ![diamine] | 9 | 452 |
| 77 | ![diamine] | 10 | 449 |
| 78 | ![diamine] | 11 | 449 |

TABLE 3-continued
synthesis of the dyesstuff with the diamines from Table 1
The following compounds shown in the table 3a were synthesized according to the example 68 or 69 using the diamine
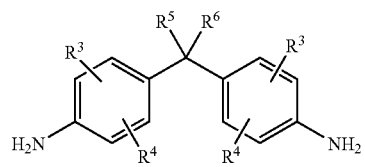
diazo component and reacted with coupling component
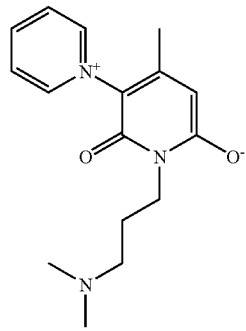
λ max (lambda max) is indicated in nm (nano meters; measured in 1% acetic acid solution).
| Dye-stuff-nr. | Diamine | Bridge-nr. | λ max |
|---|---|---|---|
| 79 | 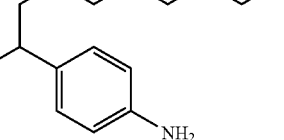 | 12 | 451 |
| 80 | 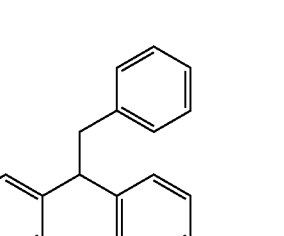 | 13 | 451 |
| 81 | 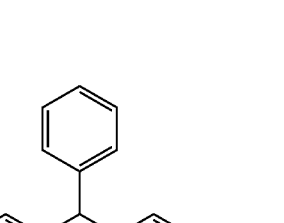 | 14 | 448 |

TABLE 3-continued
synthesis of the dyesstuff with the diamines from Table 1
The following compounds shown in the table 3a were synthesized according to the example 68 or 69 using the diamine
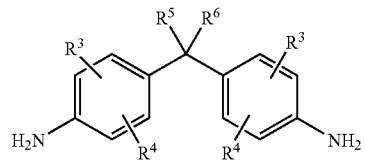
diazo component and reacted with coupling component
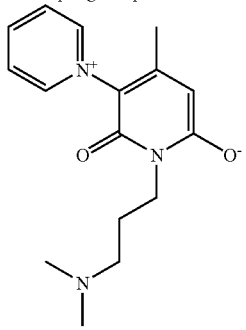
λ max (lambda max) is indicated in nm (nano meters; measured in 1% acetic acid solution).
| Dye-stuff-nr. | Diamine | Bridge-nr. | λ max |
|---|---|---|---|
| 82 | 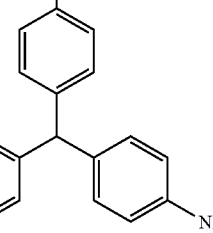 | 15 | 458 |
| 83 | 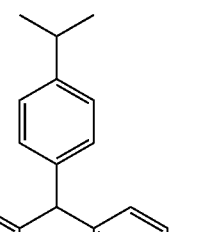 | 16 | 454 |
| 84 | 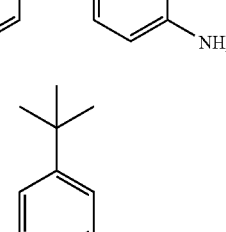 | 17 | 456 |

TABLE 3-continued synthesis of the dyesstuff with the diamines from Table 1

The following compounds shown in the table 3a were synthesized according to the example 68 or 69 using the diamine

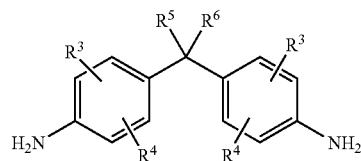

diazo component and reacted with coupling component

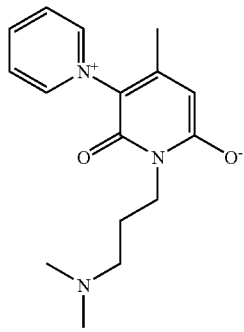

λ max (lambda max) is indicated in nm (nano meters; measured in 1% acetic acid solution).

| Dye-stuff-nr. | Diamine | Bridge-nr. | λ max |
|---|---|---|---|
| 85 | (4-methoxyphenyl)bis(4-aminophenyl)methane | 18 | 449 |
| 86 | (4-ethoxyphenyl)bis(4-aminophenyl)methane | 19 | 453 |
| 87 | bis(4-amino-3-methylphenyl)(2-methylpropyl)methane | 20 | 458 |

TABLE 3-continued
synthesis of the dyesstuff with the diamines from Table 1
The following compounds shown in the table 3a were synthesized according to the example 68 or 69 using the diamine
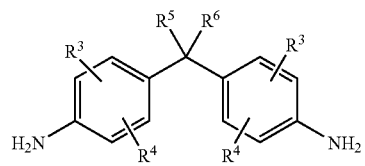
diazo component and reacted with coupling component
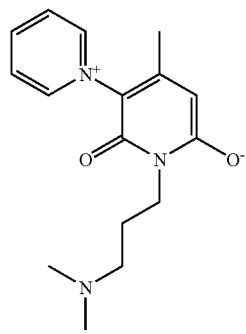
λ max (lambda max) is indicated in nm (nano meters; measured in 1% acetic acid solution).
| Dye-stuff-nr. | Diamine | Bridge-nr. | λ max |
|---|---|---|---|
| 88 | | 21 | 456 |
| 89 | | 22 | 459 |
| 90 | | 23 | 455 |

TABLE 3-continued
synthesis of the dyesstuff with the diamines from Table 1
The following compounds shown in the table 3a were synthesized according to the example 68 or 69 using the diamine
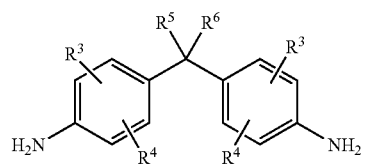
diazo component and reacted with coupling component
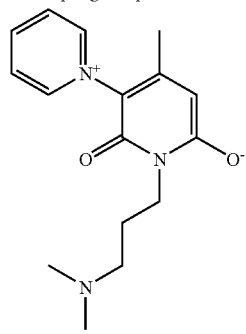
λ max (lambda max) is indicated in nm (nano meters; measured in 1% acetic acid solution).
| Dye-stuff-nr. | Diamine | Bridge-nr. | λ max |
|---|---|---|---|
| 91 | | 24 | 458 |
| 92 | | 25 | 444 |
| 93 | | 26 | 445 |

TABLE 3-continued synthesis of the dyesstuff with the diamines from Table 1

The following compounds shown in the table 3a were synthesized according to the example 68 or 69 using the diamine

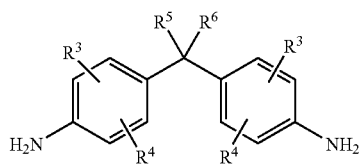

diazo component and reacted with coupling component

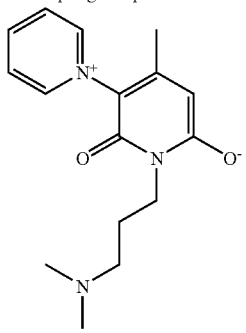

λ max (lambda max) is indicated in nm (nano meters; measured in 1% acetic acid solution).

| Dye-stuff-nr. | Diamine | Bridge-nr. | λ max |
|---|---|---|---|
| 94 | (structure) | 27 | 446 |
| 95 | (structure) | 28 | 445 |
| 96 | (structure) | 29 | 476 |

TABLE 3-continued
synthesis of the dyesstuff with the diamines from Table 1
The following compounds shown in the table 3a were synthesized according to the example 68 or 69 using the diamine
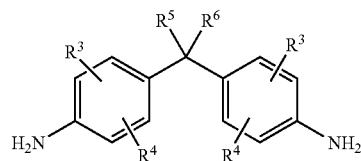
diazo component and reacted with coupling component
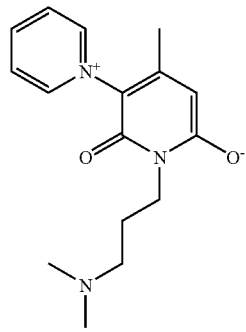
λ max (lambda max) is indicated in nm (nano meters; measured in 1% acetic acid solution).
| Dye-stuff-nr. | Diamine | Bridge-nr. | λ max |
|---|---|---|---|
| 97 | | 30 | 475 |
| 98 | | 31 | 472 |
| 99 | | 32 | 474 |

TABLE 3-continued
synthesis of the dyesstuff with the diamines from Table 1
The following compounds shown in the table 3a were synthesized according to the example 68 or 69 using the diamine
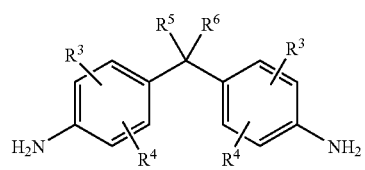
diazo component and reacted with coupling component
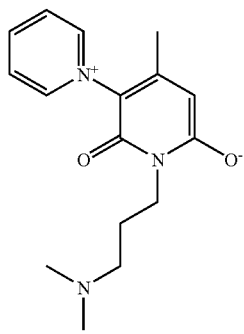
λ max (lambda max) is indicated in nm (nano meters; measured in 1% acetic acid solution).
| Dye-stuff-nr. | Diamine | Bridge-nr. | λ max |
|---|---|---|---|
| 100 | | 33 | 485 |
| 101 | | 34 | 479 |
| 102 | | 35 | 480 |

TABLE 3-continued
synthesis of the dyesstuff with the diamines from Table 1
The following compounds shown in the table 3a were synthesized according to the example 68 or 69 using the diamine
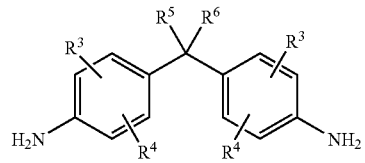
diazo component and reacted with coupling component
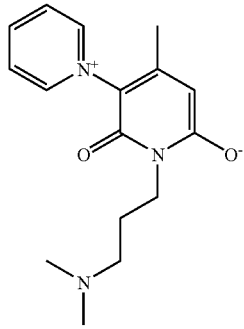
λ max (lambda max) is indicated in nm (nano meters; measured in 1% acetic acid solution).
| Dye-stuff-nr. | Diamine | Bridge-nr. | λ max |
|---|---|---|---|
| 103 | | 36 | 500 |
| 104 | | 37 | 501 |
| 105 | | 38 | 498 |

TABLE 4
synthesis of the dyesstuff with the diamines from Table 1
The following compounds shown in the table 4 were synthesized according to the example 68 or 69 using the diamine
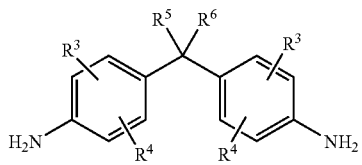
diazo component and reacted with coupling component
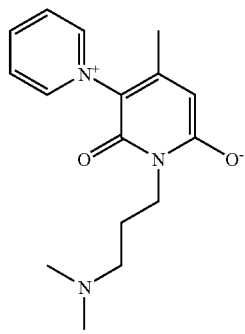
λ max (lambda max) is indicated in nm (nano meters; measured in 1% acetic acid solution).
| Dyestuff-nr. | Diamine | Bridge-nr. | λ max |
|---|---|---|---|
| 106 | | 2 | 457 |
| 107 | | 1 | 472 |
| 108 | | 5 | 446 |
| 109 | | 6 | 447 |

TABLE 4-continued synthesis of the dyesstuff with the diamines from Table 1

The following compounds shown in the table 4 were synthesized according to the example 68 or 69 using the diamine

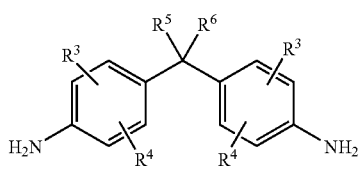

diazo component and reacted with coupling component

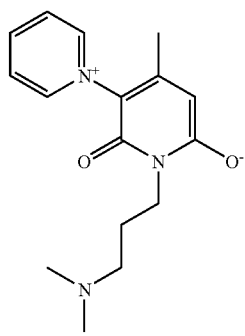

λ max (lambda max) is indicated in nm (nano meters; measured in 1% acetic acid solution).

| Dye-stuff-nr. | Diamine | Bridge-nr. | λ max |
|---|---|---|---|
| 110 | ![diamine with hexyl chain] | 7 | 446 |
| 111 | ![diamine with branched chain] | 9 | 449 |
| 112 | ![triphenylmethane diamine with p-tolyl] | 15 | 452 |

TABLE 4-continued
synthesis of the dyesstuff with the diamines from Table 1
The following compounds shown in the table 4 were synthesized according to the example 68 or 69 using the diamine
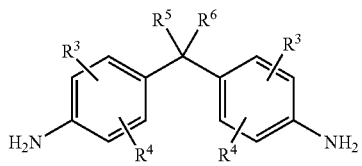
diazo component and reacted with coupling component
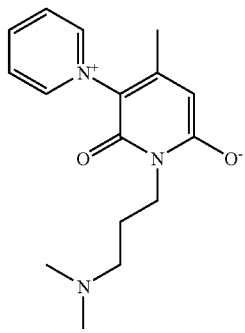 [SMILES: Cc1cc([O-])n(CCCN(C)C)c(=O)c1-[n+]1ccccc1]
λ max (lambda max) is indicated in nm (nano meters; measured in 1% acetic acid solution).
| Dye-stuff-nr. | Diamine | Bridge-nr. | λ max |
|---|---|---|---|
| 113 | 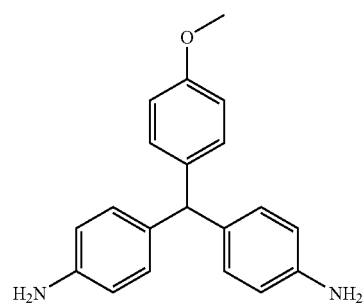 [SMILES: COc1ccc(C(c2ccc(N)cc2)c2ccc(N)cc2)cc1] | 18 | 450 |
| 114 | 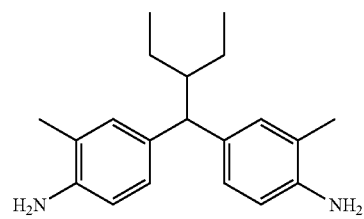 [SMILES: CCC(CC)C(c1ccc(N)c(C)c1)c1ccc(N)c(C)c1] | 21 | 458 |
| 115 | 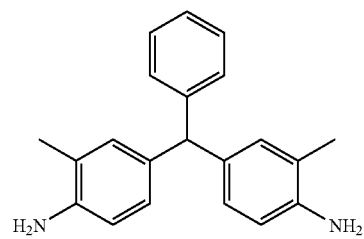 [SMILES: Cc1cc(C(c2ccccc2)c2ccc(N)c(C)c2)ccc1N] | 22 | 459 |

TABLE 4-continued
synthesis of the dyesstuff with the diamines from Table 1
The following compounds shown in the table 4 were synthesized according to the example 68 or 69 using the diamine
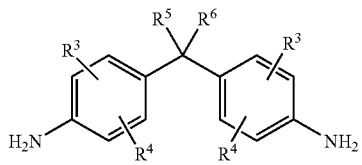
diazo component and reacted with coupling component
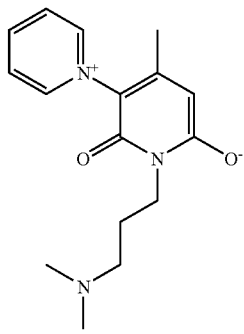
λ max (lambda max) is indicated in nm (nano meters; measured in 1% acetic acid solution).
| Dye-stuff-nr. | Diamine | Bridge-nr. | λ max |
|---|---|---|---|
| 116 | | 23 | 461 |
| 117 | | 24 | 460 |
| 118 | | 25 | 443 |

TABLE 4-continued
synthesis of the dyesstuff with the diamines from Table 1
The following compounds shown in the table 4 were synthesized according to the example 68 or 69 using the diamine
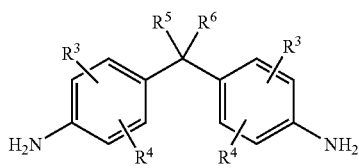
diazo component and reacted with coupling component
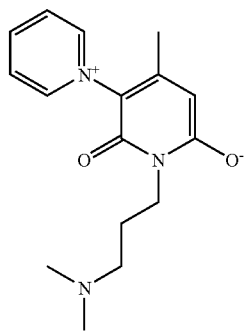
λ max (lambda max) is indicated in nm (nano meters; measured in 1% acetic acid solution).
| Dye-stuff-nr. | Diamine | Bridge-nr. | λ max |
|---|---|---|---|
| 119 | 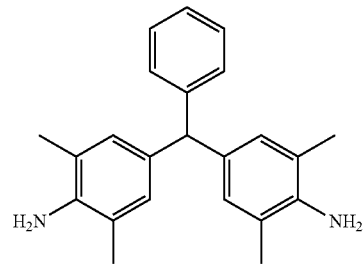 | 26 | 442 |
| 120 | 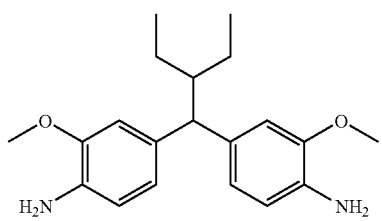 | 29 | 475 |

TABLE 4-continued
synthesis of the dyesstuff with the diamines from Table 1
The following compounds shown in the table 4 were synthesized according to the example 68 or 69 using the diamine
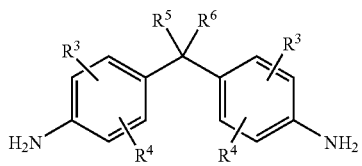
diazo component and reacted with coupling component
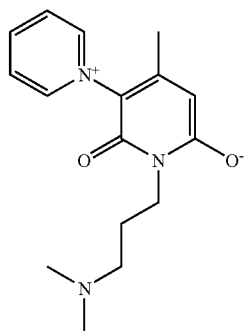 [SMILES: Cc1cc([O-])n(CCCN(C)C)c(=O)c1-[n+]1ccccc1]
λ max (lambda max) is indicated in nm (nano meters; measured in 1% acetic acid solution).
| Dye-stuff-nr. | Diamine | Bridge-nr. | λ max |
|---|---|---|---|
| 121 | 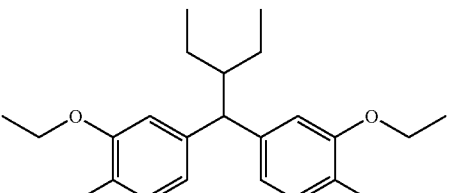 | 33 | 476 |
| 122 | 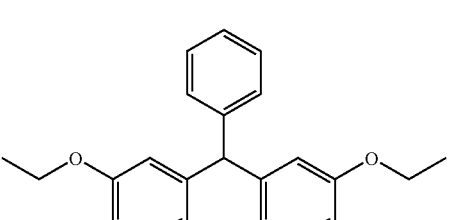 | 35 | 472 |

TABLE 5 synthesis of the dyesstuff with the diamines from Table 2

The following compounds shown in the table 5 were synthesized according to the example 68 or 69 using the diamine

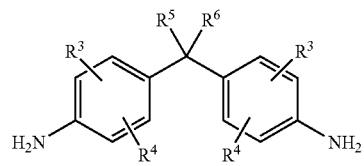

diazo component and reacted with coupling component

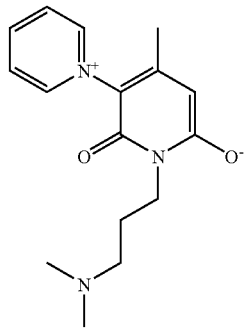

λ max (lambda max) is indicated in nm (nano meters; measured in 1% acetic acid solution).

| Dyestuff-nr. | Diamine | Bridge-nr. | λ max |
|---|---|---|---|
| 123 | | 41 | 459 |
| 124 | | 42 | 450 |
| 125 | | 43 | 448 |
| 126 | | 44 | 441 |
| 127 | | 45 | 443 |
| 128 | | 46 | 447 |
| 129 | | 47 | 444 |
| 130 | | 48 | 445 |

TABLE 5-continued synthesis of the dyesstuff with the diamines from Table 2

The following compounds shown in the table 5 were synthesized according to the example 68 or 69 using the diamine

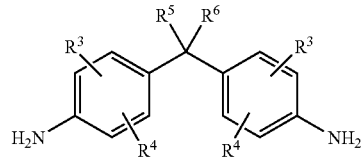

diazo component and reacted with coupling component

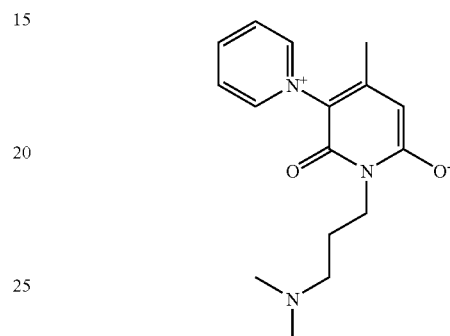

λ max (lambda max) is indicated in nm (nano meters; measured in 1% acetic acid solution).

TABLE 5-continued synthesis of the dyesstuff with the diamines from Table 2

The following compounds shown in the table 5 were synthesized according to the example 68 or 69 using the diamine

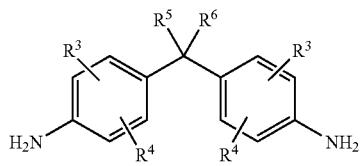

diazo component and reacted with coupling component

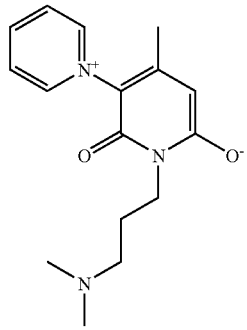 [SMILES: Cc1cc([O-])n(CCCN(C)C)c(=O)c1-[n+]1ccccc1]

λ max (lambda max) is indicated in nm (nano meters; measured in 1% acetic acid solution).

The following compounds shown in the table 5 were synthesized according to the example 68 or 69 using the diamine

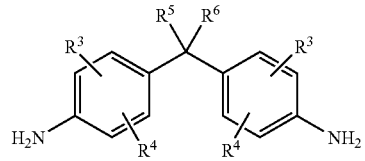

diazo component and reacted with coupling component

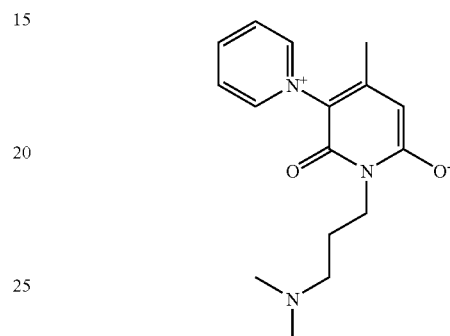

λ max (lambda max) is indicated in nm (nano meters; measured in 1% acetic acid solution).

| Dyestuff-nr. | Diamine | Bridge-nr. | λ max |
|---|---|---|---|
| 131 | (structure) | 49 | 445 |
| 132 | (structure) | 50 | 446 |
| 133 | (structure) | 51 | 440 |
| 134 | (structure) | 52 | 440 |
| 135 | (structure) | 53 | 439 |
| 136 | (structure) | 54 | 438 |
| 137 | (structure) | 55 | 434 |

TABLE 5-continued
synthesis of the dyesstuff with the diamines from Table 2
The following compounds shown in the table 5 were synthesized according to the example 68 or 69 using the diamine
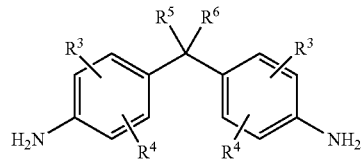
diazo component and reacted with coupling component
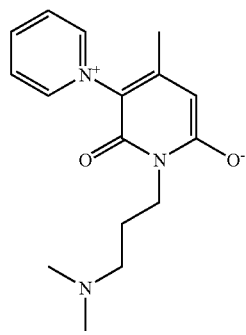
λ max (lambda max) is indicated in nm (nano meters; measured in 1% acetic acid solution).
| Dyestuff-nr. | Diamine | Bridge-nr. | λ max |
|---|---|---|---|
| 138 | | 56 | 440 |
| 139 | | 57 | 443 |
| 140 | | 58 | 441 |
| 141 | | 59 | 439 |
| 142 | | 60 | 442 |
| 143 | | 61 | 453 |
| 144 | | 62 | 452 |
| 145 | | 63 | 454 |

TABLE 5-continued synthesis of the dyesstuff with the diamines from Table 2

The following compounds shown in the table 5 were synthesized according to the example 68 or 69 using the diamine

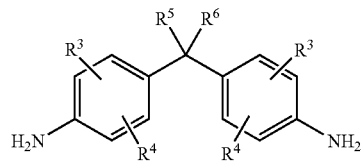

diazo component and reacted with coupling component

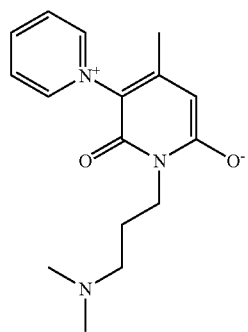

λ max (lambda max) is indicated in nm (nano meters; measured in 1% acetic acid solution).

| Dyestuff-nr. | Diamine | Bridge-nr. | λ max |
|---|---|---|---|
| 146 | | 64 | 452 |
| 147 | | 65 | 473 |
| 148 | | 66 | 475 |

TABLE 5-continued synthesis of the dyesstuff with the diamines from Table 2

The following compounds shown in the table 5 were synthesized according to the example 68 or 69 using the diamine

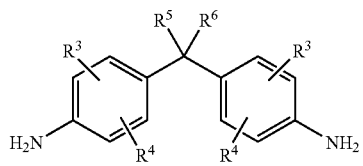

diazo component and reacted with coupling component

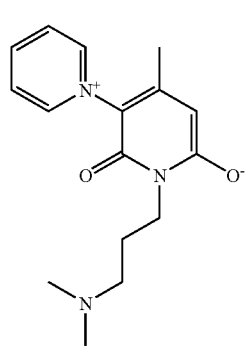

λ max (lambda max) is indicated in nm (nano meters; measured in 1% acetic acid solution).

| Dyestuff-nr. | Diamine | Bridge-nr. | λ max |
|---|---|---|---|
| 149 | | 40 | 472 |
| 150 | | 67 | 475 |

TABLE 6 synthesis of the dyesstuff with the diamines from Table 2

The following compounds shown in the table 6 were synthesized according to the example 68 or 69 using the diamine

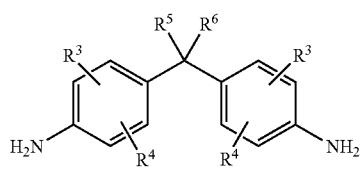

diazo component and reacted with coupling component

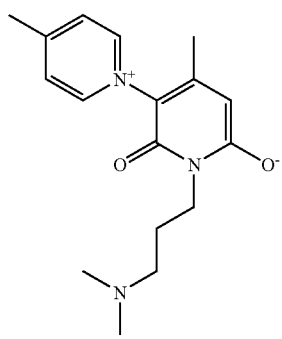 [SMILES: Cc1cc[n+](-c2c(C)cc([O-])n(CCCN(C)C)c2=O)cc1]

λ max (lambda max) is indicated in nm (nano meters; measured in 1% acetic acid solution).

| Dyestuff-nr. | Diamine | Bridge-nr. | λ max |
|---|---|---|---|
| 151 | | 41 | 446 |
| 152 | | 42 | 441 |
| 153 | | 47 | 446 |
| 154 | | 49 | 445 |
| 155 | | 52 | 441 |
| 156 | | 61 | 460 |
| 157 | | 63 | 455 |

TABLE 6-continued synthesis of the dyesstuff with the diamines from Table 2

The following compounds shown in the table 6 were synthesized according to the example 68 or 69 using the diamine

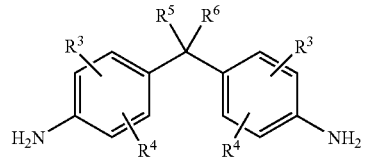

diazo component and reacted with coupling component

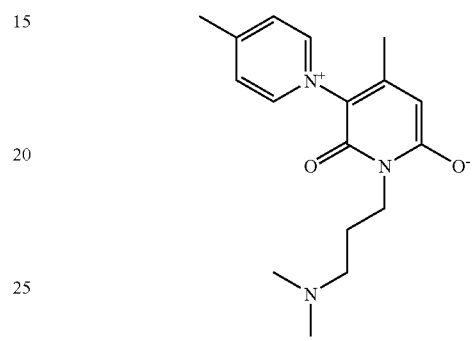

λ max (lambda max) is indicated in nm (nano meters; measured in 1% acetic acid solution).

TABLE 6-continued synthesis of the dyestuff with the diamines from Table 2

The following compounds shown in the table 6 were synthesized according to the example 68 or 69 using the diamine

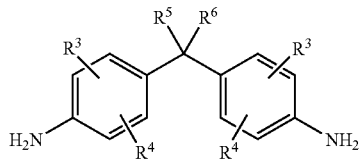

diazo component and reacted with coupling component

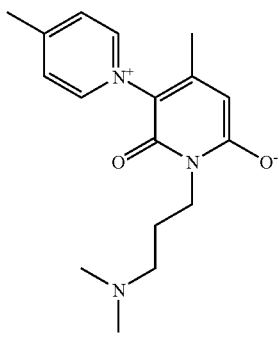

λ max (lambda max) is indicated in nm (nano meters; measured in 1% acetic acid solution).

| Dye-stuff-nr. | Diamine | Bridge-nr. | λ max |
|---|---|---|---|
| 158 | | 66 | 472 |
| 159 | | 67 | 475 |

APPLICATION EXAMPLE A 70 parts chemically bleached sulphite cellulose obtained from pinewood and 30 parts chemically bleached cellulose obtained from birchwood are beaten in 2000 parts water in a Hollander. 0.2 parts of the dyestuff of Example 68 are sprinkled into this pulp. After mixing for 10 min, paper is produced from this pulp. The absorbent paper obtained in this way is dyed yellow. The wastewater is colorless.

APPLICATION EXAMPLE B 0.2 parts of the dyestuff powder according to Example 68, were dissolved in 100 parts hot water and cooled to room temperature. The solution is added to 100 parts chemically bleached sulphite cellulose which have been ground with 2000 parts water in a Hollander. After 15 minutes thorough mixing resin size and aluminium sulphate are added thereto. Paper produced in this way has a yellow nuance and exhibits perfect light and wet fastness.

APPLICATION EXAMPLE C

An absorbent length of unsized paper is drawn at 40-50° C. through a dyestuff solution having the following composition:

> 0.3 parts of the dyestuff according to Example 68
> 0.5 parts of starch and
> 99.0 parts of water.

The excess dyestuff solution is squeezed out through two rollers. The dried length of paper is dyed a yellow shade.

The dyestuffs of Examples 69 to 159 may also be used for dyeing by a method analogous to that of Application Examples A to C. The paper dyeings obtained show good fastness properties.

APPLICATION EXAMPLE D 0.2 Parts of the dyestuff of Example 68 in acid addition salt form are dissolved in 4000 part of demineralised water at 40° C. 100 Parts of a pre-wetted cotton textile substrate are added, and the bath is raised to the boiling point over 30 minutes and held at the boil for one hour. Any water, which evaporates during dyeing, is replaced continuously. The dyed substrate is removed form the bath, and after rinsing and drying, a yellow dyeing is obtained having good light- and wet-fastness properties. The dyestuff exhausts practically totally onto the fiber, and the wastewater is almost colorless.

In a similar manner as described in Application Example D the dyestuffs according to Examples 69-159 may be used for dyeing cotton.

APPLICATION EXAMPLE E 100 parts freshly tanned and neutralized chrome leather are agitated for 30 minutes in a vessel with a liquor consisting of 250 parts of water at 55° C. and 0.5 parts of the dyestuff of Example 68 in acid addition salt form, and then treated in the same bath for 30 minutes with 2 parts of an anionic fatty liquor based on sulphonated train oil. The leather is then dried and prepared in the normal way, giving a leather evenly dyed in a yellow shade.

In a similar manner as described in Application Example E the dyestuffs according to Examples 69-159 may be used for dyeing leather.

Further vegetable-tanned leathers of low affinity may be dyed using the dyestuffs as described herein in accordance with known methods.

APPLICATION EXAMPLE F

Water is added to a dry pulp in Hollander consisting of 60% (by weight) of mechanical wood pulp and 40% (by weight) of unbleached sulphite cellulose, and the slurry is beaten in order to obtain a dry content slightly exceeding 2.5% and having a beating degree of 40° SR (degrees Schopper-Riegler). The slurry is then exactly adjusted to a high density dry content of 2.5% by adding water. 5 Parts of a 2.5% aqueous solution of the dyestuff according to Example 68 are added to 200 parts of the above resulting slurry. The mixture is stirred for about 5 minutes and, after the addition of 2% (by weight) resin size and then 4% (by weight) alum (based on the dry weight) is further stirred for a few minutes until homogeneous. The resulting pulp is diluted with about 500 parts water to a volume of 700 parts and then used for the production of paper sheets by suction on a sheet former. The resulting paper sheets are yellow.

By a method analogous to that described in Application Example F any one of the dyestuffs of Examples 69-159 may be used instead of that of Example 68. In all cases, the waste paper exhibits a substantially low residual dye concentration.

APPLICATION EXAMPLE G

Water is added to a dry pulp in a Hollander consisting of 50% (by weight) of chemically bleached sulphite cellulose obtained from pinewood and 50% (by weight) of chemically bleached sulphite cellulose obtained from birchwood, and the slurry is ground until a degree of grinding of 35° SR is reached. The slurry is then adjusted to a high density dry content of 2.5% by adding water, and the pH of this suspension is adjusted to 7.10 Parts of a 0.5% aqueous solution of the dyestuff according to Example 68 are added to 200 parts of the above resulting slurry, and the mixture is stirred for 5 minutes. The resulting pulp is diluted with 500 parts water and then used for the production of sheets by suction on a sheet former. The paper sheets thus obtained have a yellow shade.

By a method analogous to that described in Application Example G further dye mixtures may be used consisting of any one of the dyestuffs of Examples 69-159. In all cases, paper sheets are formed having a yellow shade.

APPLICATION EXAMPLE H 12.6 parts dyestuff of Example 68 are added dropwise at room temperature to a stirred mixture of 20.0 parts diethyleneglycole and 67.4 parts of demineralized water. The resulting ink exhibits good light- and water fastness properties. In a similar manner as described in Application Example H any one of the dyestuffs of Examples 69-159 may be used.

APPLICATION EXAMPLE I

A roof batten composed of Norway spruce and a roof batten composed of beechwood are sawn into pieces 5 cm in length and one piece of the sprucewood roof batten and one piece of the beechwood roof batten are dipped into a dilute solution of the reaction solution according to Example 68 (30 parts by weight of water and 1 part by weight of reaction solution, thus without isolating the dye stuff). Yellowish roof batten pieces are obtained on drying. In a similar manner as described in Application Example I any one of the dyestuffs of Examples 69-159 may be used.

The invention claimed is:

1. A compound of formula (I)

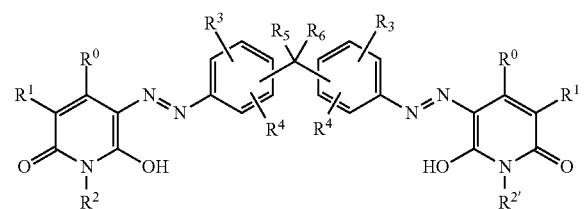

(I)

where
$R^0$ is a substituted or an unsubstituted $C_1$ to $C_4$ alkyl group,
$R^1$ is selected from the group consisting of: H, $N(R^{7'}R^{7''})$, a substituted $C_1$ to $C_4$ alkyl group, an unsubstituted $C_1$ to $C_4$ alkyl group, and CN,
$R^2$ or $R^{2'}$ are selected from the group consisting of: H, a substituted $C_1$ to $C_4$ alkyl group, an unsubstituted $C_1$ to $C_4$ alkyl group, and a group with the formula

[(CR$^8$R$^{8'}$)—(CR$^9$R$^{9'}$)$_m$—(CR$^{10}$R$^{10'}$)$_n$—(CR$^{11}$R$^{11'}$)$_o$]—NR$^{12}$R$^{12'}$ wherein
m, n and o are 1 or 0,
$R^8$, $R^{8'}$, $R^9$, $R^{9'}$, $R^{10}$, $R^{10'}$, $R^{11}$ or $R^{11'}$ are independently selected from the group consisting of: H, a substituted $C_1$ to $C_4$ alkyl group, and or an unsubstituted $C_1$ to $C_4$ alkyl group;

and $R^{12}$ or $R^{12'}$ are independently selected from the group consisting of: H, a substituted $C_1$ to $C_4$ alkyl group, and an unsubstituted $C_1$ to $C_4$ alkyl group, $R^3$ is selected from the group consisting of: H, a substituted $C_1$ to $C_4$ alkyl group, an unsubstituted $C_1$ to $C_4$ alkyl group, a substituted $C_1$ to $C_4$ alkoxy group, and an unsubstituted $C_1$ to $C_4$ alkoxy group, $R^4$ is selected from the group consisting of: H, a substituted $C_1$ to $C_4$ alkyl group, an unsubstituted $C_1$ to $C_4$ alkyl group, a substituted $C_1$ to $C_4$ alkoxy group, and an unsubstituted $C_1$ to $C_4$ alkoxy group, $R^5$ is selected from the group consisting of: H, substituted $C_1$ to $C_9$ alkyl group, and an unsubstituted $C_1$ to $C_9$ alkyl group, wherein the $C_1$ to $C_9$ alkyl group is a branched or linear $C_1$ to $C_9$ alkyl group, $R^6$ is selected from the group consisting of: a substituted $C_1$ to $C_9$ alkyl group, an unsubstituted $C_1$ to $C_9$ alkyl group, an unsubstituted aryl group, and a substituted aryl group, wherein the $C_1$ to $C_9$ alkyl group is a branched or linear $C_1$ to $C_9$ alkyl group, wherein the sum of carbon atoms of $R^5$ and $R^6$ is at least 4 carbon atoms, $R^{7'}$ or $R^{7''}$ are independently selected from the group consisting of: a substituted $C_1$ to $C_4$ alkyl group, an unsubstituted $C_1$ to $C_4$ alkyl group, and $R^{7'}$ and $R^{7''}$ form together with the nitrogen atom a five or six membered aromatic or a five or six membered cyclo alipahatic, wherein the five or six membered rings are substituted by a $C_1$ to $C_4$ alkyl group or the five or six membered rings are not further substituted.

2. A compound according to claim 1, wherein
$R^0$ is a substituted $C_1$ to $C_4$ alkyl group or an unsubstituted $C_1$ to $C_4$ alkyl group,
$R^1$ is selected from the group consisting of: $N(R^{7'}R^{7''})$, a substituted $C_1$ to $C_4$ alkyl group, and an unsubstituted $C_1$ to $C_4$ alkyl group,
$R^2$ or $R^{2'}$ is a group with the formula

[(CR$^8$R$^{8'}$)—(CR$^9$R$^{9'}$)$_m$—(CR$^{10}$R$^{10'}$)$_n$—(CR$^{11}$R$^{11'}$)$_o$]—NR$^{12}$R$^{12'}$ wherein m, n and o are 1 or 0, and $R^8$, $R^{8'}$, $R^9$, $R^{9'}$, $R^{10}$, $R^{10'}$, $R^{11}$ or $R^{11'}$ are independently selected from the group consisting of: H, a substituted $C_1$ to $C_4$ alkyl group, and an unsubstituted $C_1$ to $C_4$ alkyl group; and $R^{12}$ or $R^{12'}$ are independently selected from the group consisting of: H, a substituted $C_1$ to $C_4$ alkyl group, and an unsubstituted $C_1$ to $C_4$ alkyl group, $R^3$ is selected from the group consisting of: H, a substituted $C_1$ to $C_4$ alkyl group, an unsubstituted $C_1$ to $C_4$ alkyl group, a substituted $C_1$ to $C_4$ alkoxy group, and an unsubstituted $C_1$ to $C_4$ alkoxy group, $R^4$ is selected from the group consisting of: H, $C_1$ to $C_4$ alkyl group, and $C_1$ to $C_4$ alkoxy group $R^5$ is selected from the group consisting of: H, substituted $C_1$ to $C_9$ alkyl group, and an unsubstituted $C_1$ to $C_9$ alkyl group, wherein the $C_1$ to $C_9$ alkyl group is a branched or linear $C_1$ to $C_9$ alkyl group, $R^6$ is selected from the group consisting of: a substituted $C_1$ to $C_9$ alkyl group, an unsubstituted $C_1$ to $C_9$ alkyl group, an unsubstituted aryl group, and a substituted aryl group, wherein the $C_1$ to $C_9$ alkyl group is a branched or linear $C_1$ to $C_9$ alkyl group, wherein the sum of carbon atoms of $R^5$ and $R^6$ is at least 4 carbon atoms, $R^{7'}$ and $R^{7''}$ form together with the nitrogen atom a five or six membered aromatic, wherein the five or six membered rings is substituted by a $C_1$ to $C_4$ alkyl group or the five or six membered ring is not further substituted.

3. A compound according to claim 2, wherein $R^1$ is

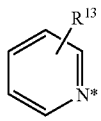

wherein the * shows the point of attachment to the rest of the molecule and wherein $R^{13}$ is selected from the group consisting of: H, a substituted $C_1$ to $C_4$ alkyl group, an unsubstituted $C_1$ to $C_4$ alkyl group, a substituted $C_1$ to $C_4$ alkoxy group, and an unsubstituted $C_1$ to $C_4$ alkoxy group.

4. A compound according to claim 3 wherein $R^2$ or $R^{2'}$ is a group with the formula

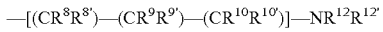

wherein $R^8, R^{8'}, R^9, R^{9'}, R^{10}$ or $R^{10'}$ are independently selected from the group consisting of: H, a substituted $C_1$ to $C_4$ alkyl group, and an unsubstituted $C_1$ to $C_4$ alkyl group; and $R^{12}$ or $R^{12'}$ are independently selected from the group consisting of: H, a substituted $C_1$ to $C_4$ alkyl group, and an unsubstituted $C_1$ to $C_4$ alkyl group.

5. A compound of formula (5):

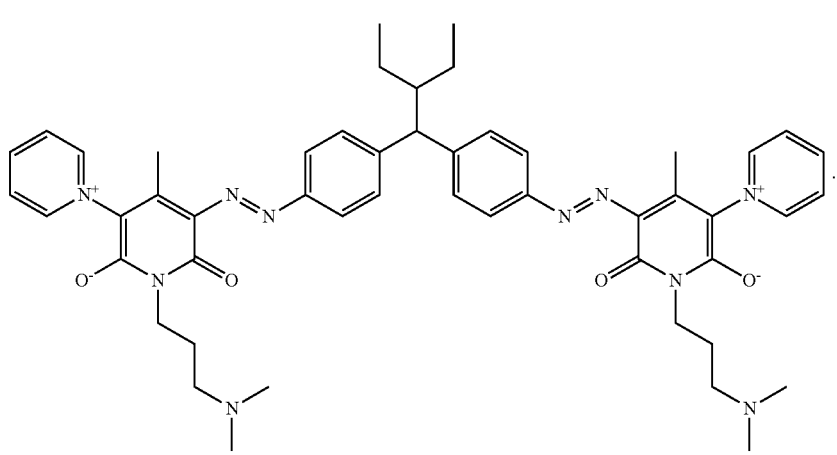

(5)

6. A compound according to claim 1, wherein $R^6$ is an unsubstituted or substituted aryl group.

7. A compound according to claim 6, wherein $R^5$ is H.

8. A compound according to claim 1, wherein the sum of carbon atoms of $R^5$ and $R^6$ together is at least 5.

9. A compound according to claim 1, wherein the sum of carbon atoms of $R^5$ and $R^6$ together is 5, 6, 7, 8, or 9.

10. A compound according to claim 1, wherein one or more of $R^5$ and $R^6$ is a substituted or unsubstituted $C_1$-$C_9$ alkyl group, wherein the $C_1$ to $C_9$ alkyl group is a branched or linear $C_1$ to $C_9$ alkyl group.

11. A compound according to claim 10, wherein $R^5$ is H.

12. A compound according to claim 1, wherein $R^5$ is H.

13. A liquid dyeing preparation or ink jet ink comprising at least one compound of formula (I) according to claim 1.

14. A compound of one of the following formulas:

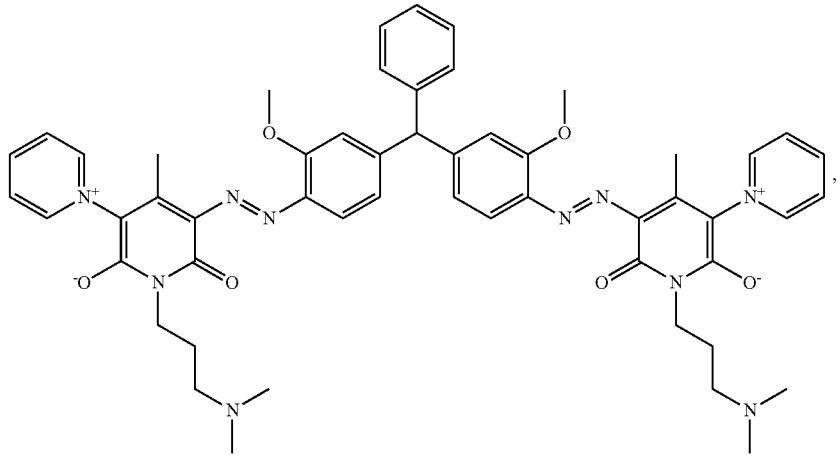

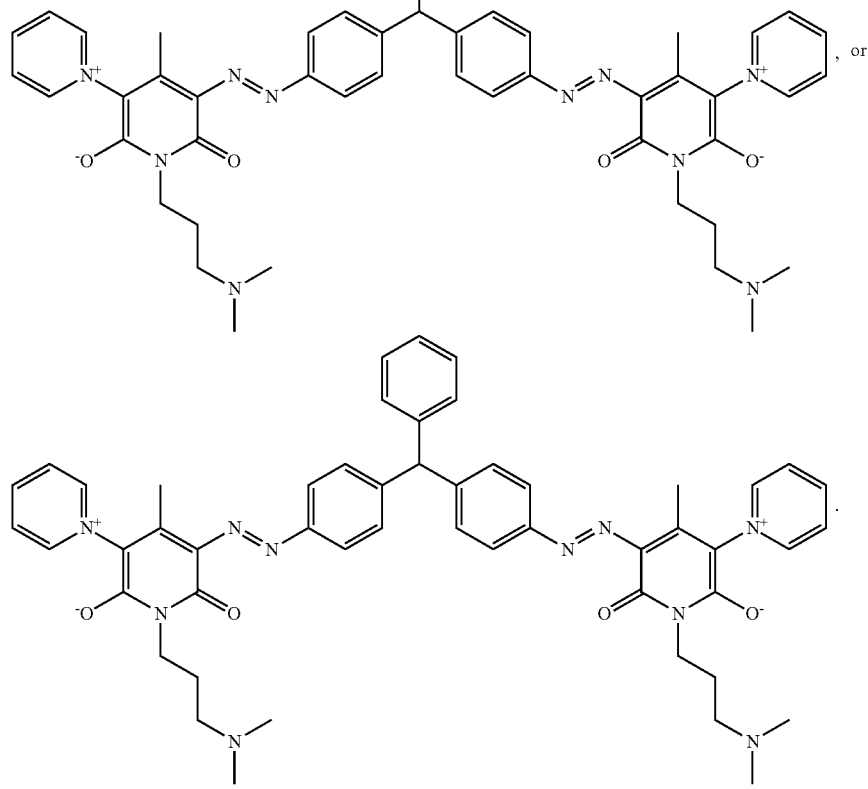
* * * * *